United States Patent
Crudge et al.

(10) Patent No.: US 7,034,937 B2
(45) Date of Patent: Apr. 25, 2006

(54) FLOW METER

(76) Inventors: Paul Crudge, Field View, Promised Land Lane, Rowton, Chester (GB) CH3 6AY; John Patrick Gillen, 3 Browelian, Dolwne Road, Old Colwyn, Conwy, North Wales (GB) LL29 8UP ( * ) Notice: Subject to any disclaimer, the term of this patent is extended or adjusted under 35 U.S.C. 154(b) by 0 days.

(21) Appl. No.: 10/619,660

(22) Filed: Jul. 15, 2003

(65) Prior Publication Data

US 2004/0060365 A1    Apr. 1, 2004

(30) Foreign Application Priority Data

Jul. 16, 2002   (GB)   .................................... 0216490

(51) Int. Cl.
*G01N 21/00*   (2006.01)
(52) U.S. Cl. ..................................... 356/337
(58) Field of Classification Search ............ 356/27–28, 356/28.5, 29, 335–343; 250/341.3; 604/251; 137/392
See application file for complete search history.

(56) References Cited

U.S. PATENT DOCUMENTS

| | | | |
|---|---|---|---|
| 4,830,494 A * | 5/1989 | Ishikawa et al. | ............. 356/336 |
| 5,004,923 A * | 4/1991 | Hillman et al. | ........... 250/341.3 |
| 5,411,052 A * | 5/1995 | Murray | ........................ 137/392 |
| 5,415,641 A * | 5/1995 | Yerlikaya et al. | ........... 604/251 |
| 6,275,284 B1 | 8/2001 | Kiel et al. | |

FOREIGN PATENT DOCUMENTS

| | | |
|---|---|---|
| EP | 0081049 A2 | 6/1983 |
| EP | 0211733 B1 | 1/1989 |
| EP | 0311176 B1 | 7/1991 |
| EP | 0536080 A2 | 9/1992 |
| EP | 0509288 B1 | 6/1995 |
| EP | 0536080 B1 | 1/1998 |
| EP | 0953827 A1 | 11/1999 |
| EP | 1144959 A1 | 4/2001 |
| EP | 1155610 A2 | 11/2001 |
| GB | 2079956 A | 1/1982 |
| SU | 616852 A | 1/1979 |
| WO | WO 8402576 A1 | 7/1984 |
| WO | WO 91/18280 | 11/1991 |
| WO | WO 01/51897 A1 | 7/2001 |

* cited by examiner

*Primary Examiner*—Tu T. Nguyen
(74) *Attorney, Agent, or Firm*—Taylor, Russell & Russell, PC

(57) ABSTRACT

The invention is a liquid volume-flow meter suitable for measuring extremely turbulent flow. The meter comprises a measuring chamber formed as a pipe having a wall of transparent material fitted inline with an existing pipe of similar diameter, whereby the detector has minimal effect upon the operation of an existing installation. The meter further comprises an optical velocity array for measuring the speed of liquid flowing within the measuring chamber and an optical area sensor for measuring the area within the measuring chamber occupied by liquid flowing. The optical area sensor comprises a plurality of arrays including a backscatter reflection array to estimate the height of liquid within the measuring chamber and at least one further correction array to correct the estimation made by the reflection array. Each array comprises an optical emitter and an optical detector that operate through the transparent wall of the measuring chamber.

27 Claims, 16 Drawing Sheets

FLOW METER

This application claims foreign priority benefits of United Kingdom patent application no. 0216490.3, filed Jul. 16, 2002.

BACKGROUND TO THE INVENTION

1. Field of the Invention

This invention relates to a flow meter. It has particular application to a flow meter that can measure volume flow of liquid in a pipe where that flow is turbulent and where the flow does not always fill the pipe. It has particular, but not exclusive, application to measuring volume flow of milk in a milking installation.

Flow of milk the pipes of a milking parlour is notoriously difficult to measure. The flow is turbulent, rapidly varying in direction, speed and volume, and the liquid that flows in the pipe is accompanied by a large amount of air, such that the milk fills a rapidly varying fraction of the cross-section of the pipe.

2. Summary of the Prior Art

Conventionally, the volume flow of milk in such a situation has been measured by volumetric means. Most generally, the milk is captured in a container of known volume that is repeatedly filled. The total volume flow can be determined by multiplying the number of times that the container by its volume. An example of such a system is disclosed in EP-A-0081049. Such systems can be reasonably accurate, but necessarily have a large number of moving parts. This makes them bulky, complex and expensive to manufacture. Moreover, the moving parts are difficult to clean which can lead to a build-up of contaminants. One solution to this problem is to measure electrical properties, such as conductivity, of the milk. However, such systems are of questionable accuracy, and even slight electrical leakage can cause irritation to an animal being milked. Moreover, installation of known sensors within an existing milking installation typically causes significant change to the pattern of milk flow within the installation, possibly interfering with operation of the system.

A principal aim of this invention is to provide a flow meter that is suitable for use with milk or other turbulently flowing liquids, that requires low maintenance and does not interfere with other processes, such as milking.

SUMMARY OF THE INVENTION

From a first aspect, the invention provides a liquid volume-flow meter comprising
  a. a measuring chamber formed as a pipe having a wall of transparent material;
  b. an optical velocity array for measuring the speed of liquid flowing within the measuring chamber; and
  c. an optical area sensor for measuring the area within the measuring chamber occupied by liquid flowing within the measuring chamber;
  in which the optical area sensor comprises a plurality of arrays including a backscatter reflection array to estimate the height of liquid within the measuring chamber and at least one further correction array to correct the estimation made by the reflection array; and
  in which each array comprises an optical emitter and an optical detector that operate through the transparent wall of the measuring chamber.

The measuring chamber can be an entirely smooth pipe fitted inline with an existing pipe of similar diameter, whereby the detector has minimal effect upon the operation of an existing installation.

The emitter of the backscatter reflection array typically causes radiation to impinge upon an upper surface of liquid in the measuring chamber and the detector detects radiation reflected back from that surface. That may provide an array that generates an output signal that varies continuously as the level of liquid in the pipe varies from the pipe being empty of liquid and the pipe being full of liquid. This can, therefore, be used as a principal detector for determining the area of the chamber that is occupied by liquid. Advantageously, the emitter of the backscatter reflection array is a narrow-angle emitter. For example, the emitter of the backscatter reflection array may have an angle of emission of approximately 8°. Moreover, the detector of the backscatter reflection array may be wide-angle detector, for example having an angle of detection of approximately 120°.

The correction array or each of the correction arrays may be of various different types. For example, they may include one or more of a multi-layer reflection array and a transmission array.

The emitter of the multi-layer reflection array can direct radiation into a body of liquid in the measurement chamber and the detector detects radiation reflected from within the body of the liquid. Typically, the radiation is directed upwardly into the liquid from below and is reflected back form within the body of the liquid. The multi-layer reflection array generates a signal that varies continuously as the depth of liquid within the chamber varies from zero to a fraction of the total depth of the chamber. It has been found that the signal may cease to change significantly once the liquid has exceeded a threshold depth. In the multi-layer reflection array, each of the emitter and detector are narrow-angle devices, for example, operating with an angle of approximately 8°.

A transmission array within this invention most usually has an emitter that directs radiation towards its detector. The transmission array may generate an output signal that is indicative of the presence or absence of liquid in the path of radiation between the emitter and the detector. The output signal may not vary significantly with the quantity of the liquid; and as such is largely binary in nature.

The velocity array may comprise a plurality of optical detectors spaced along the flow path of the measuring chamber that can detect the presence or absence of liquid at spaced positions within the chamber. Outputs from the respective optical detectors can therefore be identified as being caused by successive arrival at the detectors of liquid, and the speed of that liquid is determined by measurement of the time taken for it to pass between the detectors and of knowledge of the distance between the detectors.

Accommodation must be made in variation in the performance of the emitters due to manufacturing tolerances, age, and other factors. To achieve this, in preferred embodiments, the output of each emitter is sampled by a respective calibration detector and the power delivered to the emitter is adjusted to cause the emitter to emit energy with a predetermined intensity. The output is best sampled in a manner such that the sample is unaffected by the contents of the measuring chamber.

It is envisaged that the radiation emitted by the emitters may be visible light. However, other radiation, typically close to the visible range (e.g. infra-red) might be used instead.

A liquid volume-flow meter embodying the invention may further include a density detector for measuring the optical density of the liquid being measured. The output from the density detector is used to modify the output of the optical area sensor to correct variations in the output that might arise from variation of the optical density of the liquid.

A liquid volume-flow meter embodying the invention may further comprise a controller programmed to control the emitters and to analyse signals received from the receivers to generate an output indicative of volume-flow or volume-flow rate.

Most typically, embodiments of the invention provide a volume-flow meter for measuring the volume-flow of milk in a milking installation being in accordance with any preceding claim.

From a second aspect, this invention provides a method of measuring liquid volume-flow in a volume-flow meter comprising: at a plurality of measurement arrays
  a. directing radiation from an optical emitter through a transparent wall into a measuring chamber and
  b. detecting a proportion of that radiation emerging from the measuring chamber
    I. at one array, by backscattering, measuring the depth of liquid in the measuring chamber to arrive at a first estimate if the area of the chamber occupied by flowing liquid; and
    II. at one or more other array making a further optical measurement to derive a corrected area measurement from the first estimate;
  c. at an optical velocity array measuring the speed of liquid flowing within the measuring chamber; and
  d. calculating volume flow from the velocity and the corrected area measurement.

Typically, the further optical measurement includes one or more of a multi-layer scattering measurement and a transmission measurement. Alternatively or additionally, the method may further include making a measurement of the optical density of the liquid and modifying the estimate of the area of liquid.

DETAILED DESCRIPTION OF THE PREFERRED EMBODIMENTS

An embodiment of the invention will now be described in detail, by way of example, and with reference to the accompanying drawings.

The embodiments will be described in relation to a volume-flow measuring device for use in a milking installation. However, it should be understood that embodiments can be configured for metering other non-clear liquids that are flowing in a turbulent manner.

Figure 1A:
FIGS. 1a and 1b are cross-sectional views to illustrate the turbulent nature of milk flow in a pipe carrying milk from a milking machine.
Figure 1B:
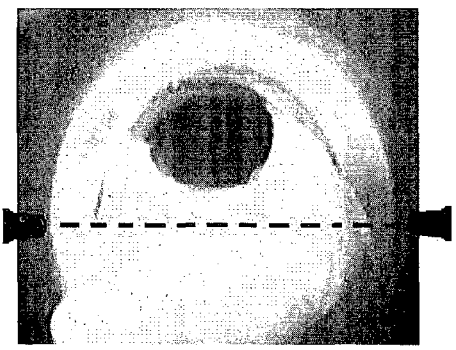

As will be seen from FIG. 1, the type of flow that is to be measured is potentially highly complex, liquid filling a partial and variable proportion of the area of the pipe.

Introduction to the Detection Systems

To calculate the volume of a moving mass of milk flowing through a pipe in any given time period it is necessary to know the cross-sectional area and the length of the mass. The following equation and then be applied:

Volume=Cross-Sectional Area×Length.

Research was carried out to investigate the relationship between selected optical devices and milk flowing through a measuring chamber in formed from a glass pipe. Numerous test arrays were constructed with a view to measuring the level of the milk in the glass pipe from which a cross-sectional area could be calculated. Research into milk flow characteristics during transport in the application revealed the following difficulties:

Milk density changed due to oxygenation and variations in butterfat levels;

Milk travelled chaotically through a typical system and exhibited centrifugal flow characteristics, and consequently travelled through the glass pipe in one of many formations.

An array was developed which measures cross-sectional area. It is includes the following components:

A backscatter reflection array

A multi-layer reflection array

A transmission array

Figure 2:
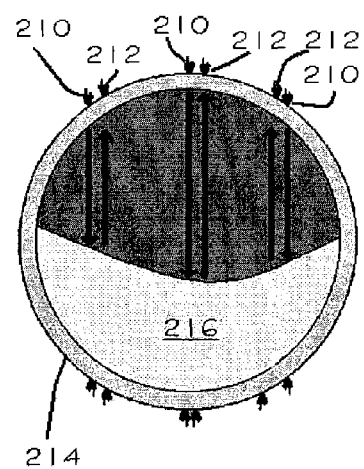
FIG. 2 illustrates a backscatter reflection array used in the development of the invention.

The backscatter reflection array, three of which are shown in FIG. 2, comprises a narrow-angle emitter 210 and a wide-angle detector 212 both directed downwardly onto milk within a length of pipe 214 that constitutes a measuring chamber. The pipe 214 is formed of transparent material, preferably optical glass, having, in this embodiment, a circular cross-section. Glass has proven to be advantageous because it is durable, easily cleaned, and there is a lesser tendency for milk splashes to stick to it than there is with plastic.

Figure 2A:
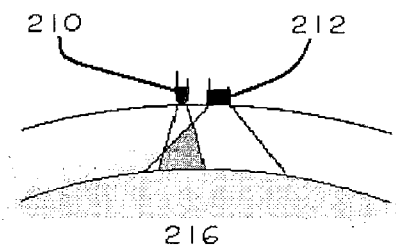
FIG. 2a is an enlarged view of the emitters and detectors of the array of FIG. 2.

The angles of the emitter and the detector are typically 8° and 120° respectively. This produces a sensor that can be used to detect the level of milk 216 in the pipe up to and including a full pipe. The angle of the detector must be sufficiently wide to detect light reflected from the milk even when it is almost or entirely to the top of the pipe, as shown in FIG. 2a. If the detector's angle is too narrow, a reflection from the surface of the milk, when very close to it, might fall outside the field of the detector. Operation of the array can be enhanced by positioning the emitter with a slight angle towards the detector. Consequently, if the pipe is full, or the top quadrant of the pipe is populated, the signal is reinforced the by reflection on the wall of the pipe, so the integrity of the reflection characteristic is sustained.

Figure 3:
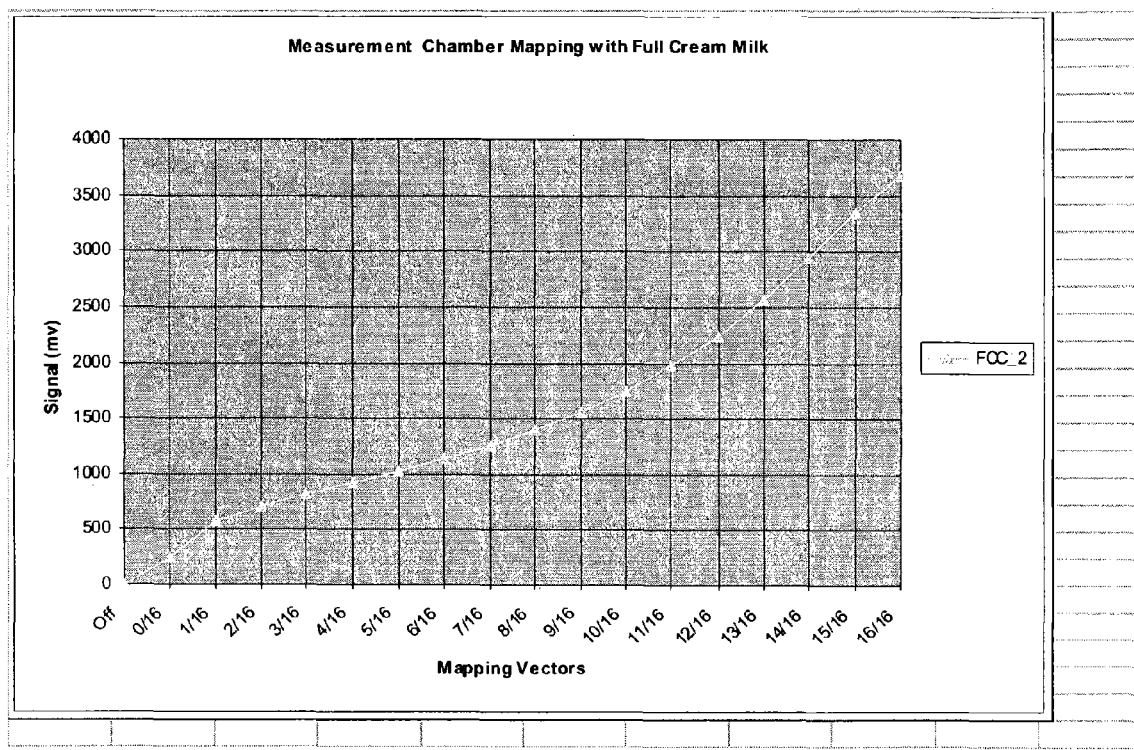
FIG. 3 is a graph showing the output of the array of FIG. 2.

FIG. 2 shows multiple arrays in application illustrating how the surface can be profiled in the measurement of cross-sectional area. FIG. 3 shows the shows the increase in signal level against incremental Increases in the level of milk 216 in the sensor chamber.

The output of the detectors varies in relation to the height of milk in the pipe. The relationship for any given sensor and pipe, the output can be determined readily by experiment. The relationship between the output and the height of the milk for this embodiment is shown in FIG. 3, the height of the milk on the x-axis being expressed in units of $1/16$ of the height of the pipe 214.

As will be seen, the backscatter reflection array produces an output that varies as the level of milk in the pipe varies from none at all to full. However, this array is insufficient to give rise to a determination of the area of milk in the pipe because of the possibility of air spaces below the surface of the milk. Moreover, the graph presented is based on the assumption that the surface of the milk is approximately level; an approximation that may be highly inaccurate. Therefore, further measurements must be made by way of the other arrays in order to accommodate this.

Figure 4:
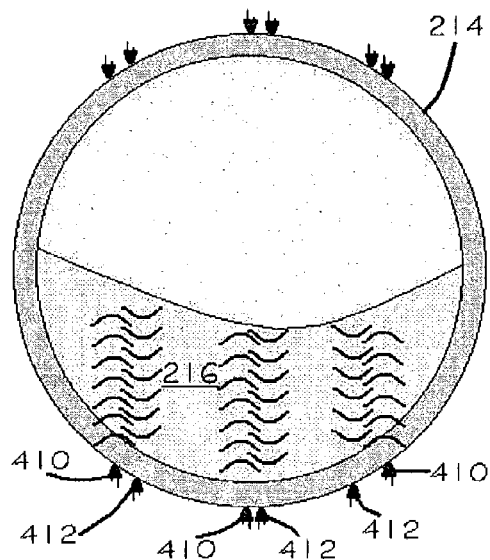
FIG. 4 illustrates a multi-layer reflection array used in the development of the invention.
Figure 5:
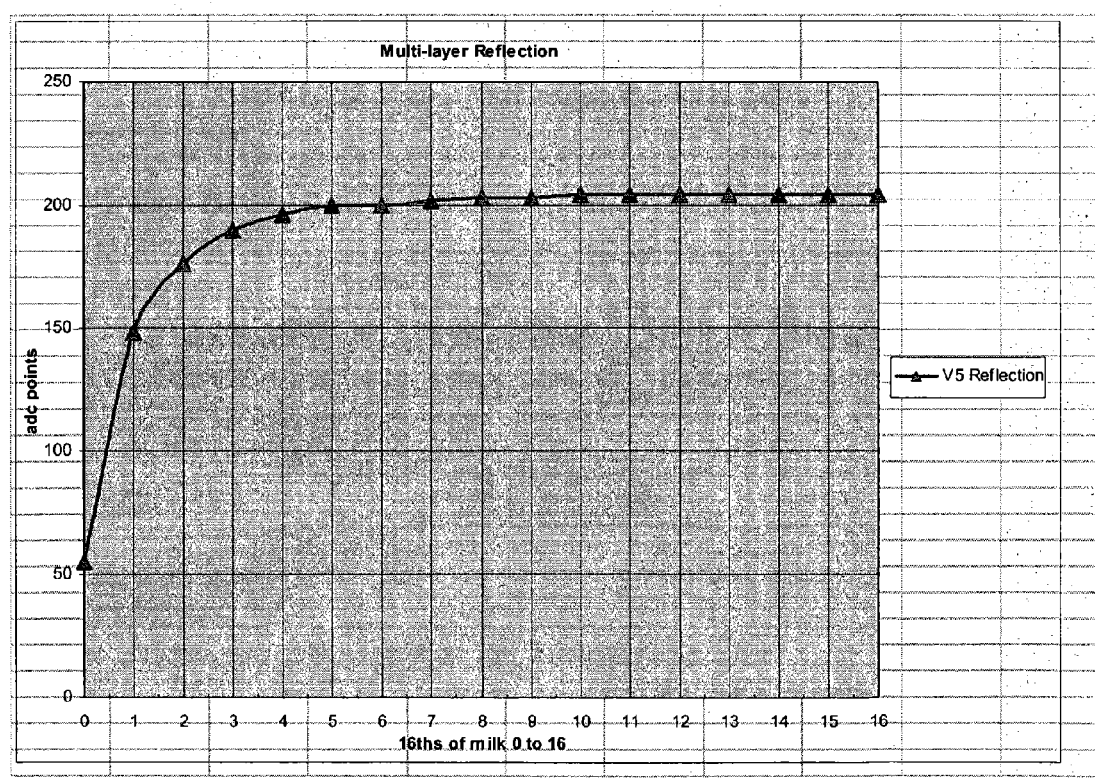
FIG. 5 is a graph showing the output of the array of FIG. 4.

Each multi-layer reflection array, three being shown in FIG. 4, uses a narrow angle emitter 410 and a narrow angle detector 412. Research has revealed that if an array is positioned with a constant interface; i.e. the array is covered by the milk 216, the reflection characteristics will alter with a predictable relationship to the depth of the mass at the measurement point. FIG. 4 shows multiple multi-layer reflection arrays to illustrate how the surface can be profiled in the measurement of cross-sectional area. FIG. 5 shows the relationship between the signal level with respect to incremental increases in the level of milk in the pipe in the region of the array.

As will be seen, this array provides a signal that can give an indication of the depth of milk in the pipe from zero to about $6/16$ of the depth of the pipe.

Figure 6:
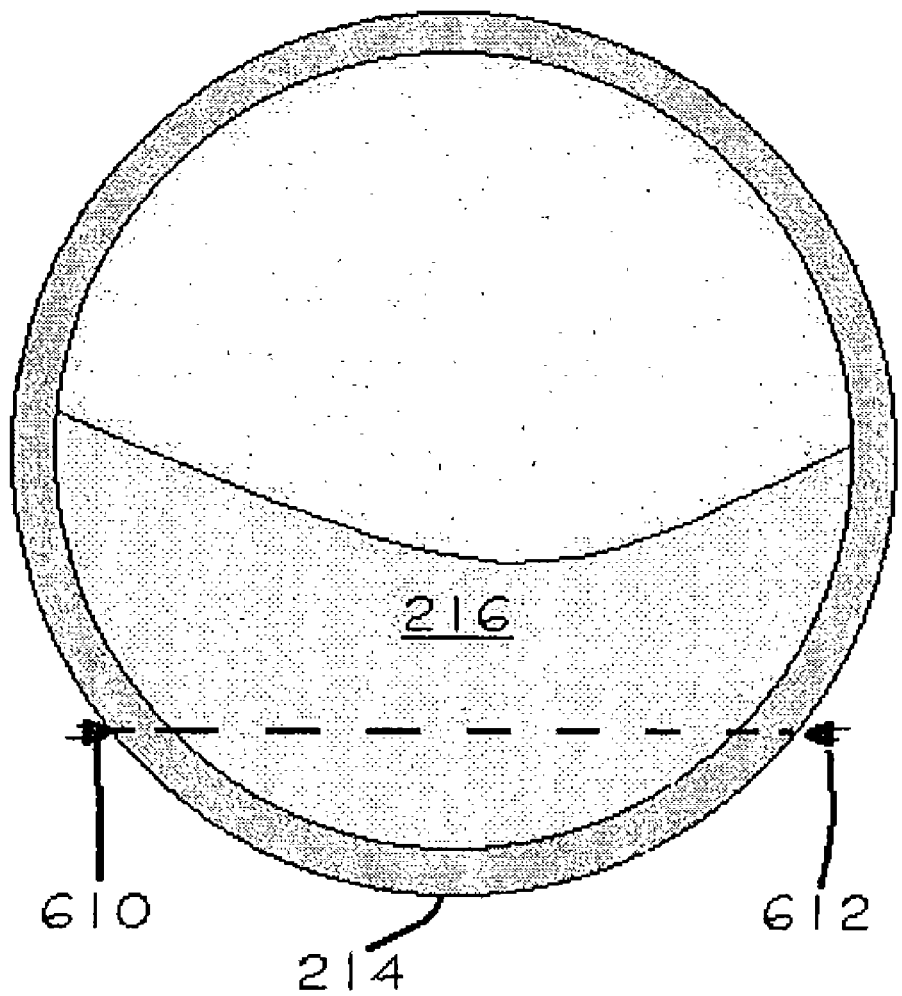
FIG. 6 illustrates a transmission array used in the development of the invention.

The transmission array, as shown in FIG. 6 is constructed by positioning an optical emitter 610 at one side of the pipe 214 and a detector 612 at the opposite side, such that the beam of the emitter takes the path of a cord of the cross-section of the pipe 214. When the emitter 610 is switched on, in the absence of milk 216 in the pipe 214, light travels unobstructed to the detector and a relatively large electrical signal will be generated by the detector 612. When a mass of milk passes into the pipe 214, the signal will be greatly attenuated, as only a very small percentage of light will pass through the mass of milk. This array has an output that is substantially binary in nature, in contrast with the variable output of the arrays described above. This characteristic enables the transmission array to be used in the detection of a moving mass of milk 216 within the pipe 214.

Application in the Embodiment

Figure 7:
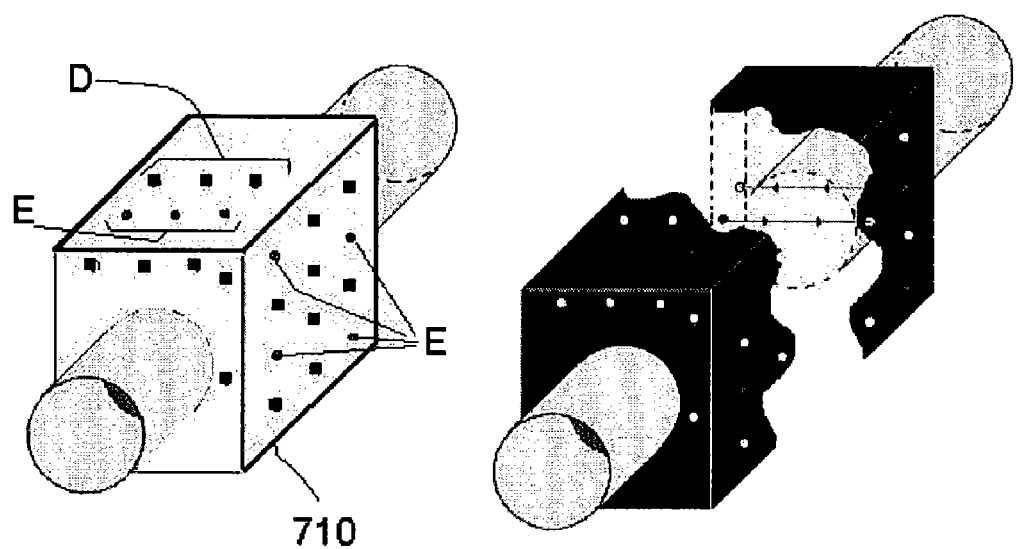
FIG. 7 illustrates a combined array within a volume-flow measuring device embodying the invention.
Figure 7A:
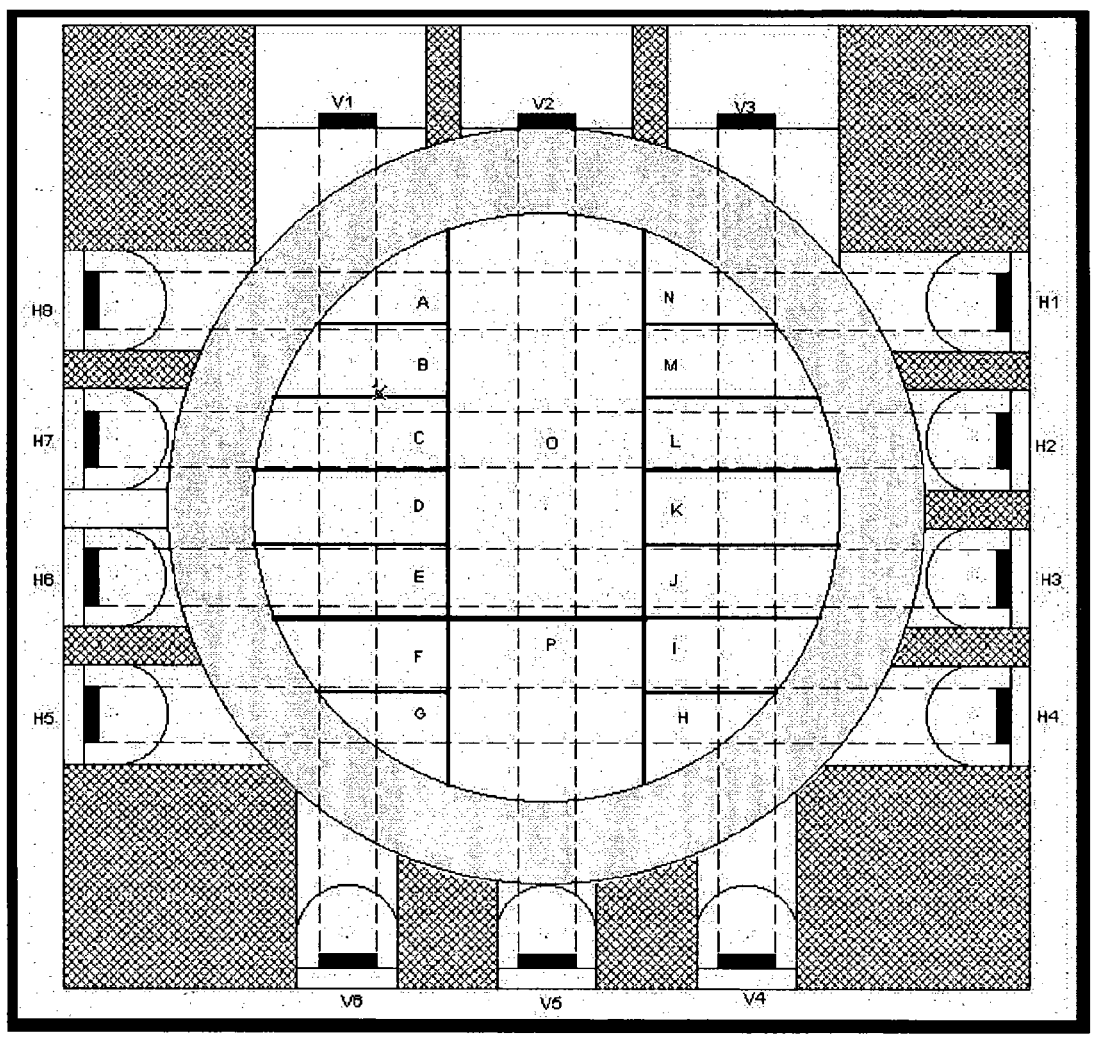
FIG. 7a is a cross-sectional view of the array of FIG. 7.
Figure 11:
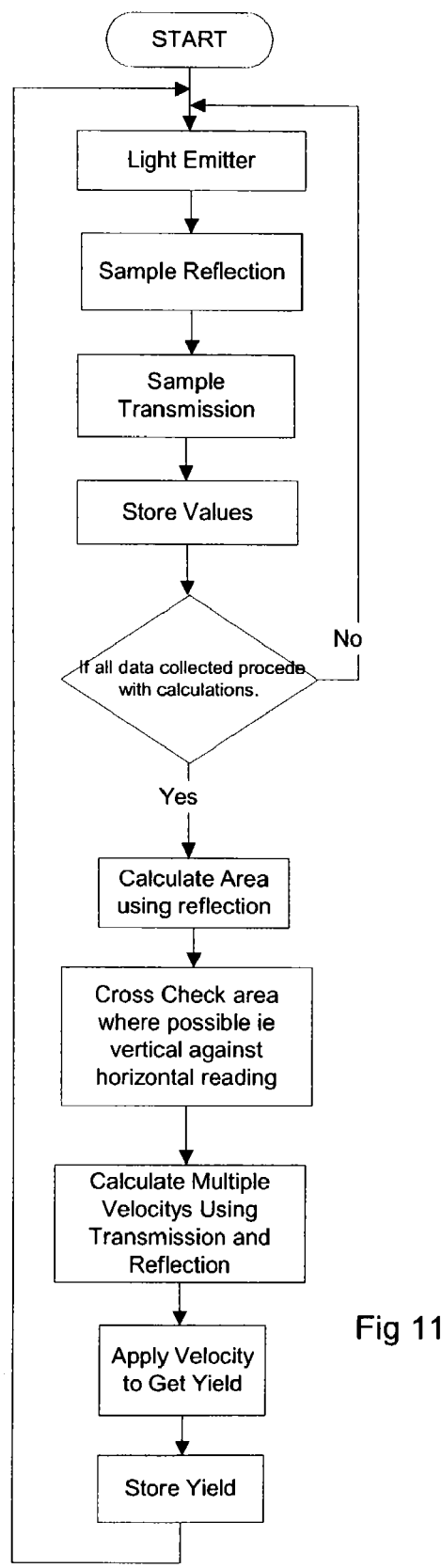
FIG. 11 is a flowchart that summarises the steps performed in making a flow measurement in apparatus embodying the invention.
Figure 12:
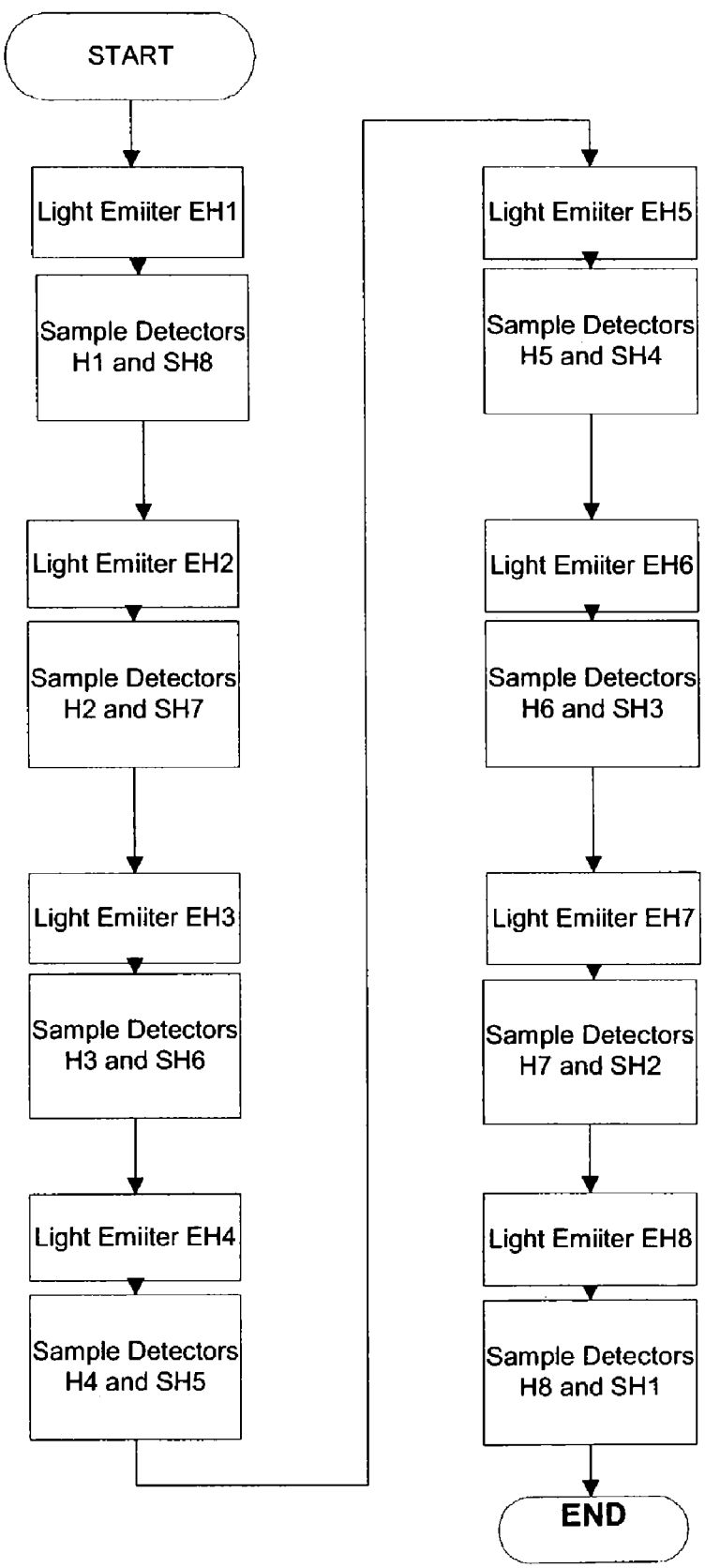
FIG. 12 is a flowchart that summarises the steps performed in making area measurement using horizontal detection arrays in an embodiment of the invention.
Figure 13:
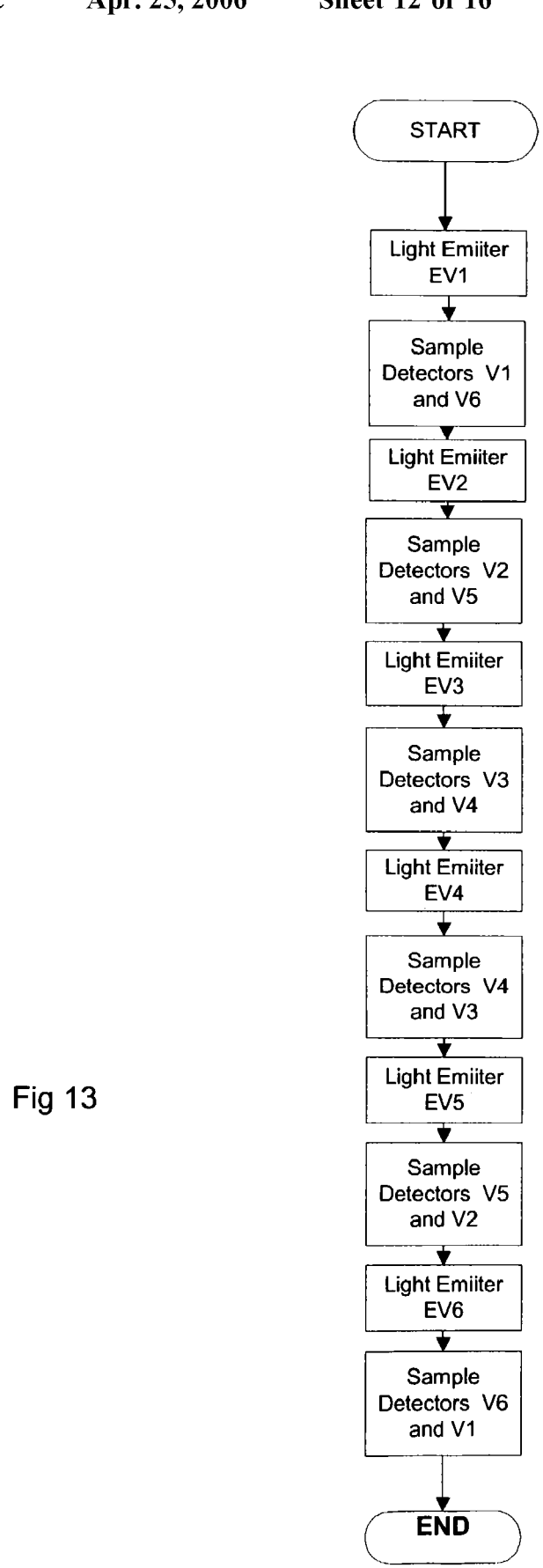
FIG. 13 is a flowchart that summarises the steps performed in making area measurement using vertical detection arrays in an embodiment of the invention.

Cross-sectional area measurement is achieved in embodiments of the invention by combination of the above-described optical arrays, as outlined in the flow charts of FIGS. 11 to 13. The resulting combined array is shown in FIGS. 7 and 7a. In FIG. 7, the detectors the emitters 'E'; and the other devices are detectors. All of the devices shown in FIG. 7a are detectors; emitters are omitted in the interest of clarity. Each emitter can cooperate with one or more detectors; in the latter case, the detector can either operate in backscatter reflection or multi-layer reflection mode. Detectors V1, V2 and V3 are used in backscatter reflection mode. Detectors H1–H8 and V4, V5 and V6 are used in multi-layer reflection mode. When an emitter is activated, it is possible to obtain a reading in both multi-layer and backscatter mode simultaneously. The emitters and detectors are carried in a mounting block 710, formed in this embodiment from a machined block of plastic, that surrounds the pipe 214. All of the emitters and detectors are controlled by a controller (to be described below) that performs the calculations necessary to determine volume flow.

In FIG. 7, the middle detectors are the ones shown in FIG. 7a. On the side arrays, each emitter directly faces a detector and vice versa. On the sides of the block 710 there are eight transmission arrays in total, divided into two blocks of four (each side of the cross-sectional area arrays) separated by 10 mm.

One of the transmission arrays has an emitter and a detector that operates in the infra-red frequency band. This array normally operates as described above. However, it can also operate in a density-measuring mode to make optical density measurements of the milk flowing in the pipe. (Factors such as fat level or oxygen content, among others, can affect the optical density.) In this mode, the emitter is supplied with a short pulse of current that is significantly higher than the current normally used to drive the device. This produces an output of magnitude that will pass through the milk to reach the associated detector. The amount of light received by the detector is directly related to the optical density of the milk through which it is passing.

When making an optical density measurement it is necessary to ensure that the section of the pipe in which the measurement is taken always contains the same mass per unit area of milk. The array measurements must confirm that the bottom $3/16$ of the pipe is populated before an optical density measurement is taken. Otherwise, the density figure would be underestimated because is less milk in the measuring cell rather than because the actual optical density. If the mass of milk is fixed then a variation in the signal level generated at the detector will be result from an effective optical density of the mass of milk.

The internal area of the pipe 214 is divided up into notional segments, as shown in FIG. 7, used in calculation of the milk flow. The segments are arranged as a matrix. The number of these segments that is occupied by milk in the central column of the pipe can be determined by the values from detectors V2 and V5 which each operate as multi-layer reflector arrays. The side smaller segments, which are mainly square, are plotted according to several different detector readings and error checked against each other. For example, segment S5 in the lower-left corner is populated subject to the reading from multi-layer reflector array H5 and cross-checked against detectors V1 and V6.

The multi-layer reflection technology being used to do this can be taken further and the whole area could be divided into, a square matrix of area segments. The present embodiment is limited to useable measurements in multi-layer reflection up to 5/16th of the diameter or approx 8.88 mm (6.38 mm if glass excluded).

The general formula for the cross-sectional area is as follows:

$$Area=A[H8]+C[H7]+B+N[H1]+L[H2]+M+E[H6]+G[H5]+F[V6]+J[H3]+H[H4]+I[V4]+D+K+P[V2]+O[V5]$$

For each area segment, there is an associated look-up table (A . . . O), which has been populated with values that correspond to the calibrated reading from the respective detector. These arrays are populated during manufacture of the device. The value of each element in the look-up table is closely dependent upon the precise configuration of an embodiment, and these can be determined by experiment. The relevant detector is reading is subsequently used as an index pointer address into the associated look-up table (as expressed in the above formula) to retrieve the appropriate area value. The population of segments; B, M, D & K are dependent on the population of other segments and are best described with conditional statements.

IF $(C[H7]>C\_THRESHOLD)$

THEN $B=C[H7]$

ELSE $B=B[V1]$

The above statement checks area C and compares it against a preset threshold to determine if there is a relevant quantity of milk in this segment. If the statement is true, area B will be populated with the same quantity of milk. If the statement is false, array B will be accessed using the vertical array V1 as an index. This allows an estimation to be made of the population of area segments that cannot be observed directly by any of the arrays.

In embodiments that make optical density measurements, the measured optical density is used to generate an offset that is added to the index used to access the look-up tables, thereby adjusting the calculated area value to compensate for variations in the detector outputs arising from variation in the optical density.

The above formulae enable measurement of the area of the pipe that is occupied by milk. As discussed, to measure volume flow, it is also necessary to measure the speed of flow within the pipe.

Figure 8A:
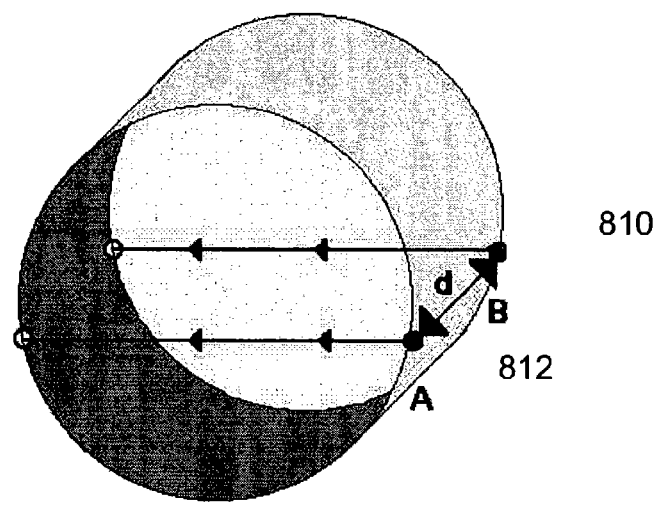
FIGS. 8a, 8b and 8c are diagrams showing a cross-comparison measuring arrangement in reflection mode in a measuring chamber of the embodiment.
Figure 8B:
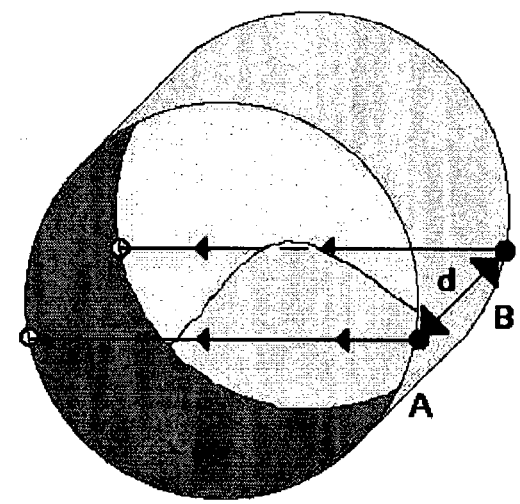
Figure 8C:
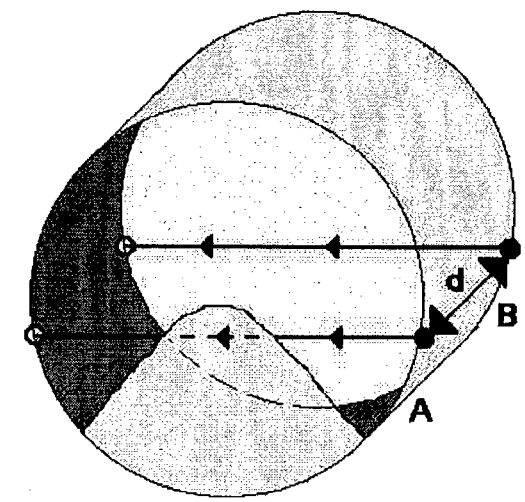

As shown in FIGS. 8a to 8c, the system has upstream and downstream horizontal transmission arrays 810, 812, spaced by a distance d along the pipe. Milk flowing in the pipe 214 will first be detected by the upstream array, as shown in FIG. 8b, and a short time later, by the downstream array, as shown in FIG. 8c. By correlation of the signals received from the detectors of these two arrays, the processor can track a feature between the two arrays, and measure the transit time t between detection at the two arrays 810, 812. Having measured the value t it is possible to calculate the velocity of the feature using the formula $$V=distance/time$$

Where t is in ms and d is in mm, he result in millimetres/millisecond (mm/ms). Using a fixed sample time the length parameter, being the length of a body of milk within the pipe, is calculated using the equation:

$$Length=Velocity/Sample\ time$$

This measuring system cannot accurately track velocity at a single measuring point. Therefore, a practical embodiment has several of the velocity arrays described above, four in this embodiment. The controller array integrates multiple velocity measurement points which enables the system to both track an accelerating flow and accurately track velocities over a broad range of flow rates.

In order that velocity measurements can be made as the height of milk in the pipe varies, the velocity array is Finally, the controller can calculate volume from the parameters determined above. Having derived the cross-sectional area from the level measurement and the length of the milk sample over, say, a 1 ms period from the velocity measurement the volume can be calculated by:

$$V=Area \times Length.$$

Figure 14:
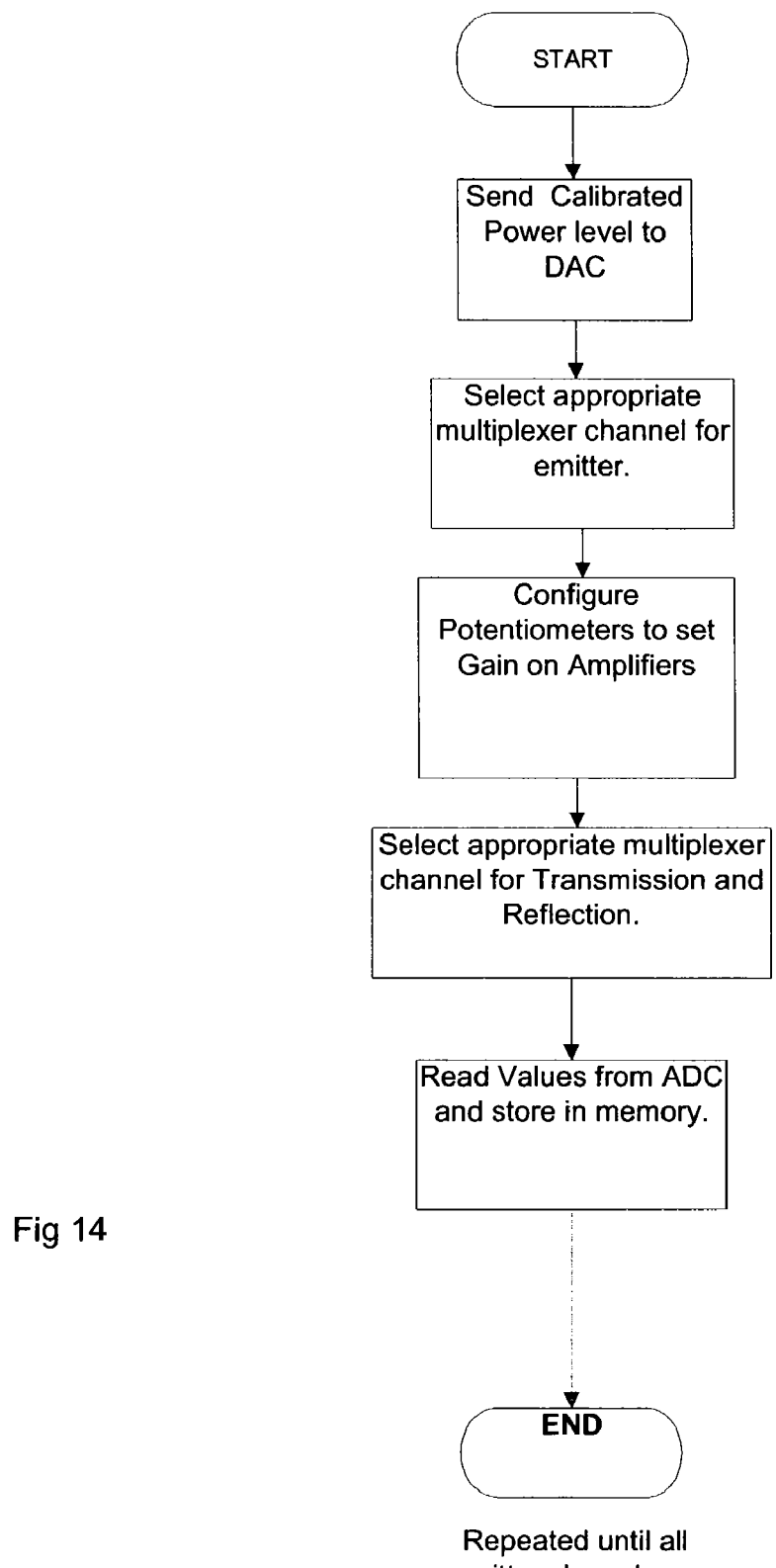
FIG. 14 is a flowchart that that summarises the steps performed in calibrating emitters in an embodiment of the invention.

In order to provide an accurate output, the system requires that the optical arrays provide a stable repeatable measuring system. Semiconductor optical components, by their nature, are subject to variations in their performance due to manufacturing variation, temperature and ageing effects. Therefore, it is highly preferable that the embodiment includes a calibration system. This will be described with reference to FIG. 9. The calibration system operates by taking controlled samples of light radiated from each of the emitters independently from the effects of other components and comparing it against a stored vector collected from the array during manufacture variations in the radiated power may be identified. The calibration algorithm then adjusts the power delivered to the emitter that is being calibrated until the calibration sample conforms to the reference value. The calibration procedure is summarised in the flowchart of FIG. 14.

Figure 9:
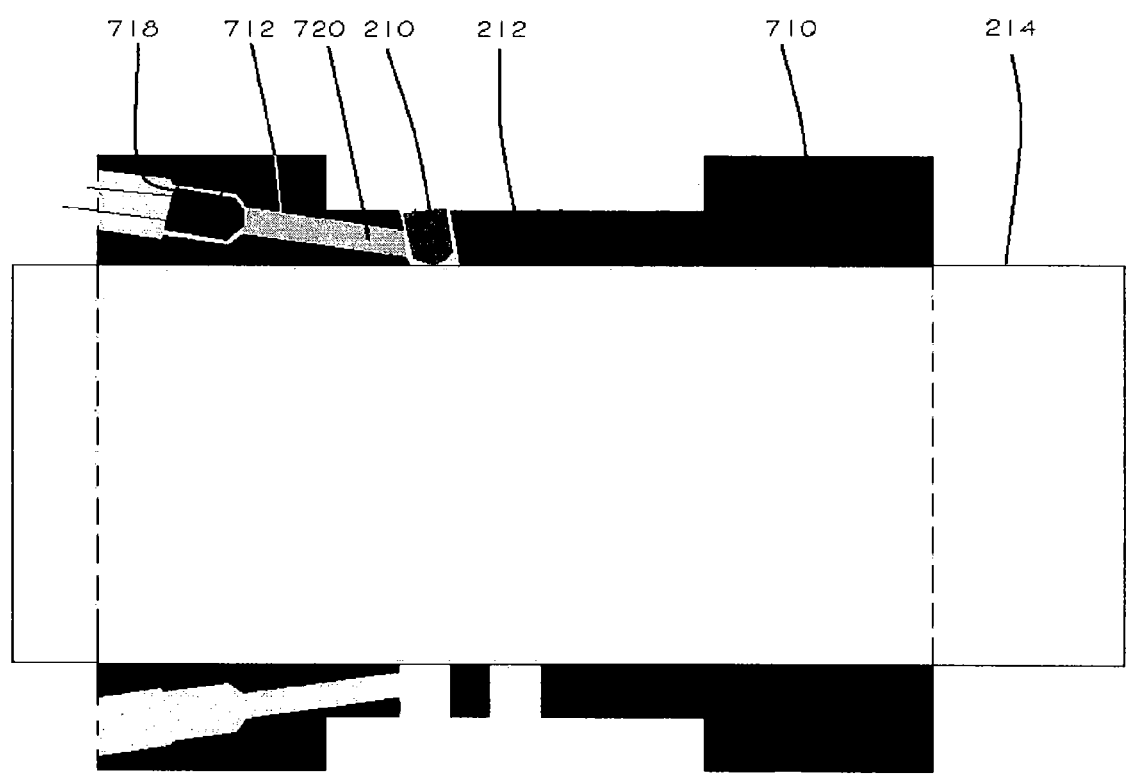
FIG. 9 is a diagram of a calibration system of the embodiment.

FIG. 9 illustrates the calibration array structure that is constructed in the mounting block 710. A channel 712 is machined within the block 710 to provide an optical pathway between an emitter 210 and a corresponding calibration detector 718. A translucent optical fibre waveguide 720 is inserted into this channel, such that:

1. the waveguide 720 collects light emitted by the periphery of the emitter 210 such that it does not interfere with operation of the emitter in a detector array. The fibre ensures that sufficient light is channelled along the optical pathway;
2. the fibre establishes a constant, stable interface between the emitter 210 and the corresponding calibration detector 718; and
3. the properties of the fibre are selected to transmit a controlled level of light to prevent the calibration detector becoming saturated.

Hardware Implementation

Figure 10:
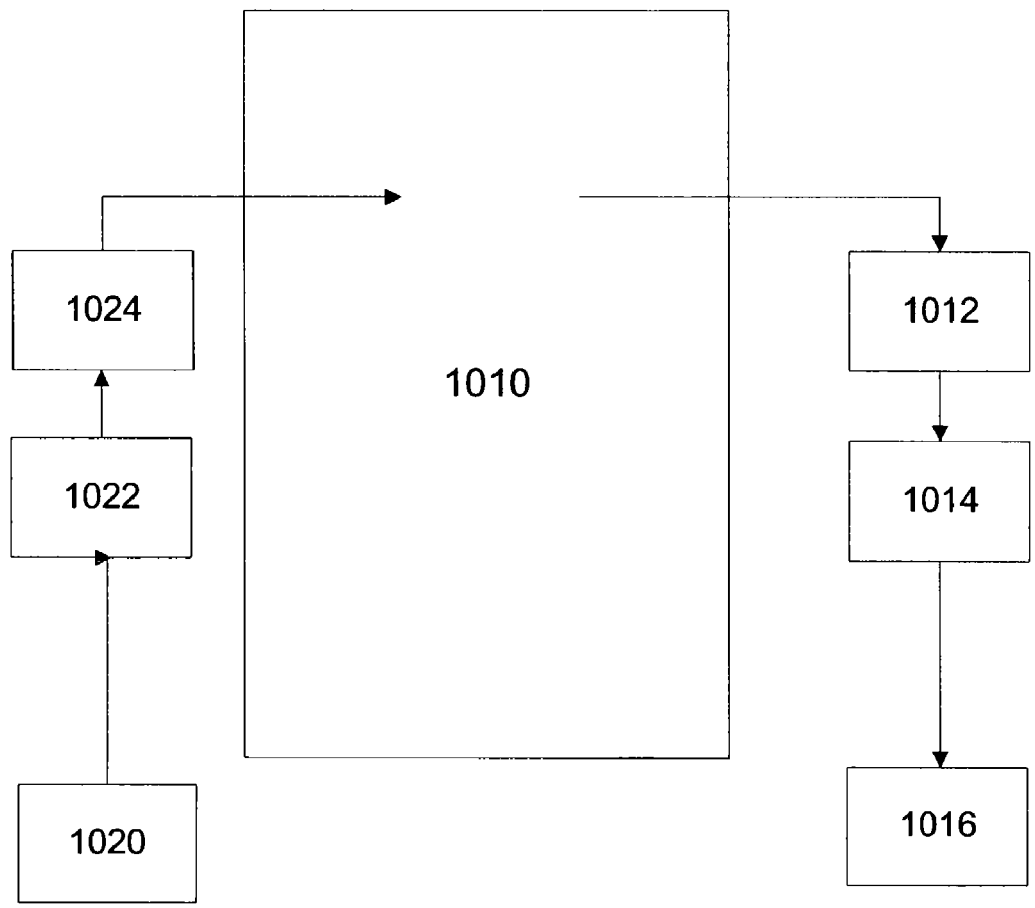
FIG. 10 is a block diagram of hardware components of an embodiment of the invention.

The hardware within which the controller of this embodiment is implemented is illustrated diagrammatically in FIG. 10.

The controller is constructed around a RISC processor 1010. Outputs of the processor 1010 are connected through a digital-to-analogue converter (DAC) 1012, the output of which is processed by a high-powered amplifier 1014 to drive the; emitters. The output of the amplifier 1014 is connected to the emitters through a multiplexer 1016 whereby the processor 1010 can select which of the emitter will receive the output signal. Before a signal is applied to an emitter, the appropriate calibration values for that particular emitter are loaded into the DAC 1012 to ensure that the optical output of the emitter is at the correct level.

Signals from the detectors 1018 are fed through a multiplexer 1020 to the input of an instrumentation amplifier 1022. As with the emitters, the multiplexer 1020 enables the processor 1010 to select which one of the detectors it will sample. The output of the instrumentation amplifier 1022 is sampled by an analogue-to-digital converter (ADC) 1024. The processor 1010 receives the data from the ADC 1024 and uses that data as input to its measurement algorithm. The results of the algorithm, representative of volume flow, are output for processing by external systems.

The cross-sectional area is calculated by a series of reflection and backscatter measurements were certain assumptions are made. The multi-layer reflection mode works on the principle that with a constant interface of milk on the sensor wall the depth of the liquid at that point can be determined and consequently certain areas within the cross-section area map are populated.

The reality of the situation is that due to the extreme variability of the flow, scenarios occur where there is no such interface, the surface of the milk sample being positioned away from the glass. It is important to detect these and make alternative measurements to ensure the accuracy of the cross-sectional area is preserved.

Figure 15:
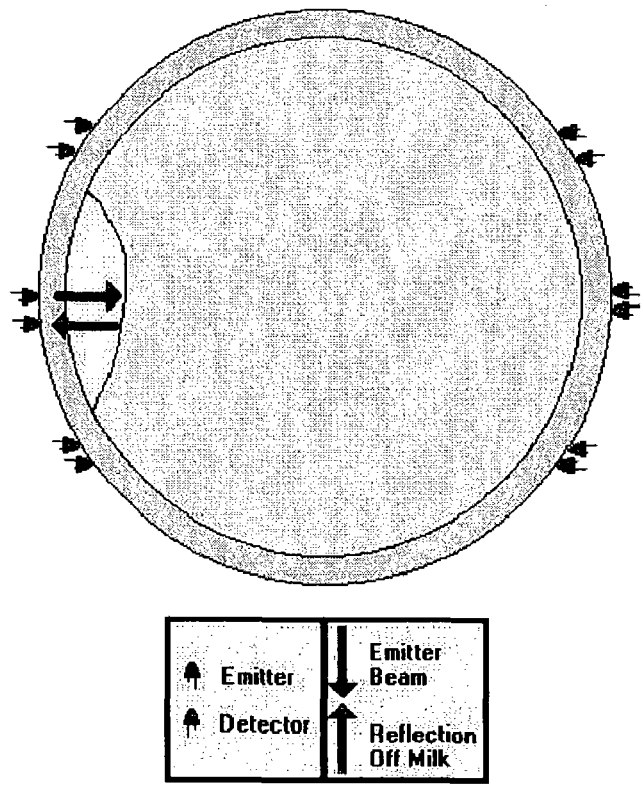
FIG. 15 is a diagram of light reflecting from an air bubble within a measuring chamber.
Figure 16:
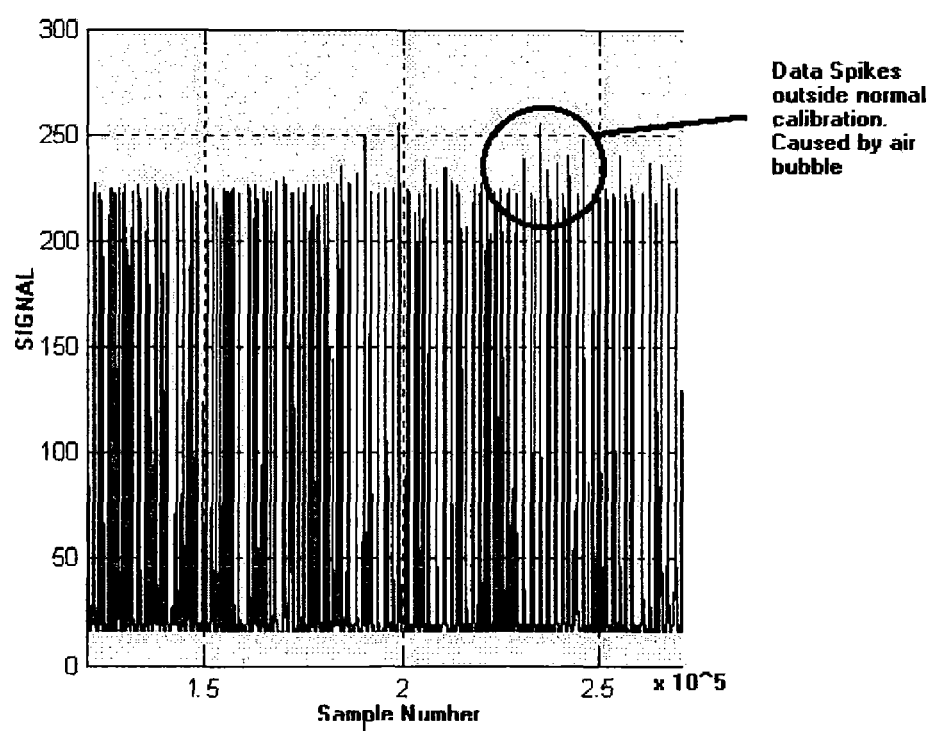
FIG. 16 is a graph of reflection data showing spikes caused by a bubble, as shown in FIG. 15.

As a result of the design if the scenario shown in FIG. 15 occurs, the signal generated at the multi-layer detector increases out of its operational band, drawing attention to the fact that the nature of the sensor wall/measuring medium interface has changed. This characteristic can be seen on any of the multi-layer reflection arrays as spikes in the output, as shown in FIG. 16. This allows them to be correspondingly corrected.

Figure 17:
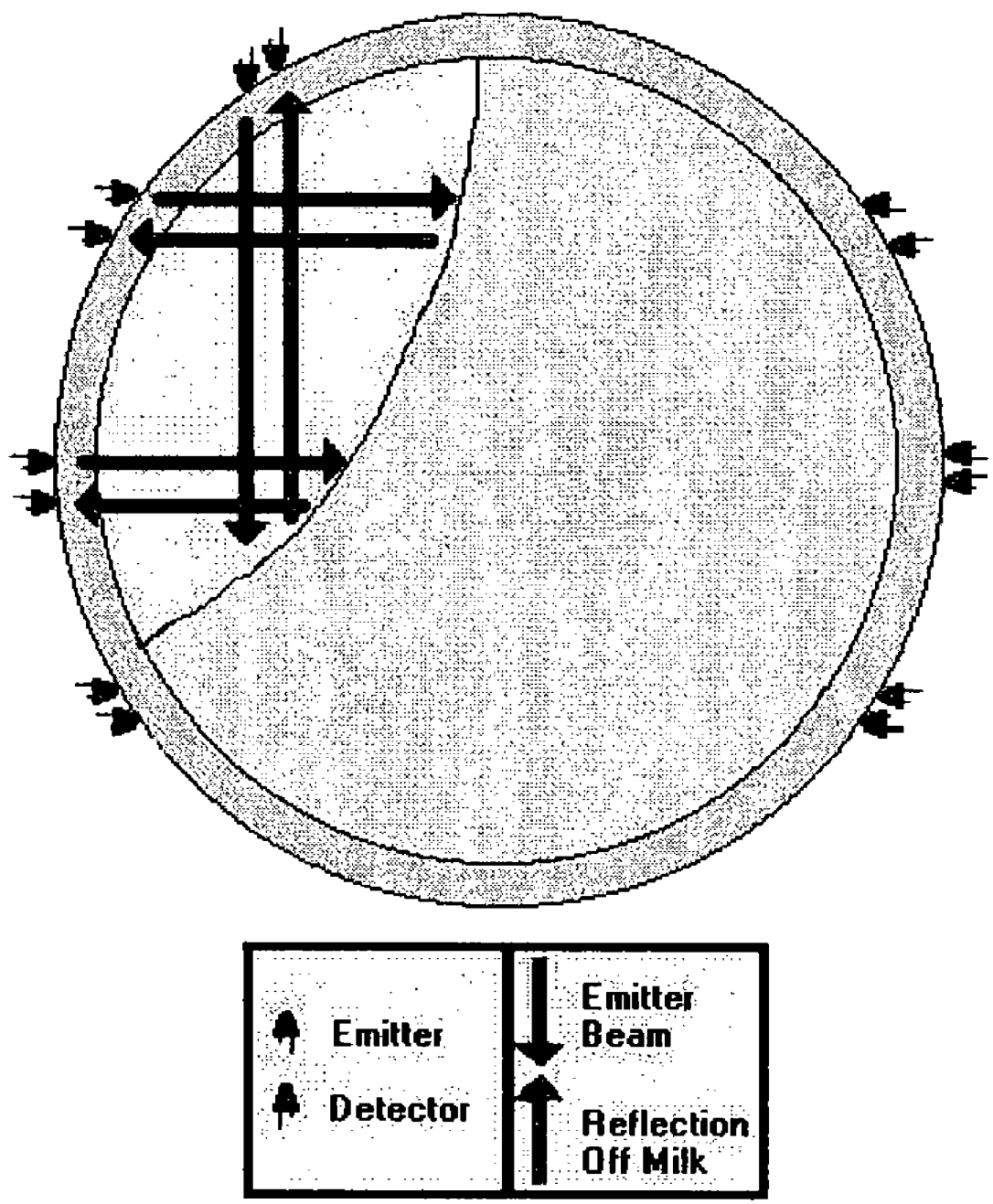
FIG. 17 is a diagram showing a cross-comparison measuring arrangement between horizontal and vertical arrays in a measuring chamber of the embodiment.
Figure 18A:
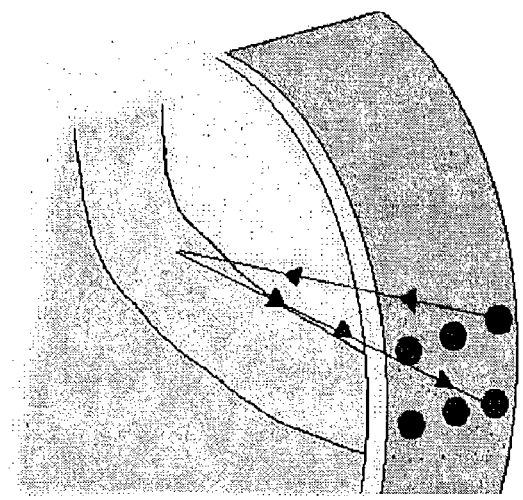
FIG. 18 is a diagram showing a cross-comparison measuring arrangement in reflection mode in a measuring chamber of the embodiment.
Figure 18B:
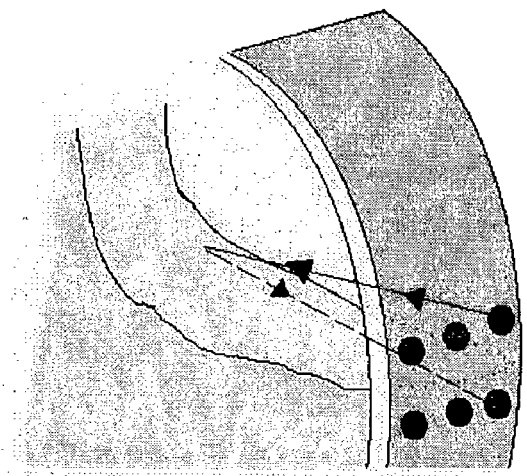
Figure 18C:
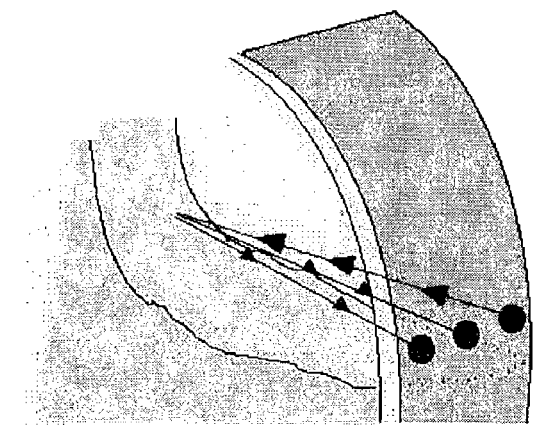

FIG. 17 shows how it is generally possible to use vertical arrays to cross-check horizontal measurements to determine whether they are reflection or multi-layer reflection measurements. However, if a scenario occurs such as illustrated in FIG. 15, the vertical data will be out of range in respect of cross checking the horizontal array. FIGS. 8A to 8C show how it is possible to do a cross comparison in reflection mode using secondary detectors to determine the distance to the medium being measured and assess whether the relevant defined area is to be populated.

In this embodiment, the emitters are light-emitting diodes that radiate visible red light, and the detectors are suitably sensitive photodiodes. Alternative embodiments may operate in other frequency ranges, for example in infra-red. Further embodiments may receive inputs from other devices to improve upon the accuracy of the area and velocity measurements.

What we claim is:

1. A liquid volume-flow meter comprising
   a. a measuring chamber formed as a pipe having a wall of transparent material;
   b. an optical velocity array for measuring the speed of liquid flowing within the measuring chamber; and
   c. an optical area sensor for measuring the area within the measuring chamber occupied by liquid flowing within the measuring chamber;
   in which the optical area sensor comprises a plurality of arrays including a backscatter reflection array to estimate the height of liquid within the measuring chamber and at least one further correction array to correct the estimation made by the reflection array; and
   in which each array comprises an optical emitter and an optical detector that operate through the transparent wall of the measuring chamber.

2. A liquid volume-flow meter according to claim 1 in which the emitter of the backscatter reflection array causes radiation to impinge upon an upper surface of liquid in the measuring chamber and the detector detects radiation reflected back from that surface.

3. A liquid volume-flow meter according to claim 1 in which the backscatter reflection array generates an output signal that varies continuously as the level of liquid in the pipe varies from the pipe being empty of liquid and the pipe being full of liquid.

4. A liquid volume-flow meter according to claim 1 in which the emitter of the backscatter reflection array is a narrow-angle emitter.

5. A liquid volume-flow meter according to claim 4 in which the emitter of the backscatter reflection array has an angle of emission of approximately 8°.

6. A liquid volume-flow meter according to claim 1 in which the detector of the backscatter reflection array is a wide-angle detector.

7. A liquid volume-flow meter according to claim 6 in which the detector of the backscatter reflection array has an angle of detection of approximately 120°.

8. A liquid volume-flow meter according to claim 1 in which the correction array or each of the correction arrays includes a multi-layer reflection array.

9. A liquid volume-flow meter according to claim 8 in which the emitter of the multi-layer reflection array directs radiation into a body of liquid in the measurement chamber and the detector detects radiation reflected from within the body of the liquid.

10. A liquid volume-flow meter according to claim 8 in which the multi-layer reflection array generates a signal that varies continuously as the depth of liquid within the chamber varies from zero to a fraction of the total depth of the chamber.

11. A liquid volume-flow meter according to claim 8 in which each of the emitter and the detector of the multi-layer reflection array are narrow-angle devices.

12. A liquid volume-flow meter according to claim 11 in which the angles of emission and detection of the emitter and detector of the multi-layer reflection array is approximately 8°.

13. A liquid volume-flow meter according to claim 1 in which the correction array or each of the correction arrays includes a transmission array.

14. A liquid volume-flow meter according to claim 13 in which the emitter of the transmission array directs radiation towards the detector of the transmission array.

15. A liquid volume-flow meter according to claim 14 in which the transmission array generates an output signal that is indicative of the presence or absence of liquid in the path of radiation between the emitter and the detector.

16. A liquid volume-flow meter according to claim 1 in which the velocity array comprises a plurality of optical detectors spaced along the flow path of the measuring chamber that can detect the presence or absence of liquid at spaced positions within the chamber.

17. A liquid volume-flow meter according to claim 16 in which outputs from the respective optical detectors are identified as being caused by successive arrival at the detectors of liquid, and the speed of that liquid is determined by measurement of the time taken for it to pass between the detectors and of knowledge of the distance between the detectors.

18. A liquid volume-flow meter according to claim 1 in which the output of each emitter is sampled by a respective calibration detector and the power delivered to the emitter is adjusted to cause the emitter to emit energy with a predetermined intensity.

19. A liquid volume-flow meter according to claim 1 in which the radiation emitted by some or all of the emitters is visible light.

20. A liquid volume-flow meter according to claim 1 in which the radiation emitted by some or all of the emitters is infra-red light.

21. A liquid volume-flow meter according to claim 1 further including a density detector for measuring the optical density of the liquid being measured.

22. A liquid volume-flow meter according to claim 21 in which an output from the density detector is used to modify the output of the optical area sensor.

23. A liquid volume-flow meter according to claim 1 further comprising a controller programmed to control the emitters and to analyse signals received from the detectors to generate an output indicative of volume-flow or volume-flow rate.

24. A milking installation including a volume-flow meter according to claim 1 for measuring the volume-flow of milk.

25. A method of measuring liquid volume-flow in a volume-flow meter comprising: at a plurality of measurement arrays a. directing radiation from an optical emitter through a transparent wall into a measuring chamber and b. detecting a proportion of that radiation emerging from the measuring chamber
   i. at one array, by backscattering, measuring the depth of liquid in the measuring chamber to arrive at a first estimate if the area of the chamber occupied by flowing liquid; and
   ii. at one or more other array making a further optical measurement to derive a corrected area measurement from the first estimate;

c. at an optical velocity array measuring the speed of liquid flowing within the measuring chamber; and d. calculating volume flow from the velocity and the corrected area measurement.

26. A method according to claim 25 in which the further optical measurement includes one or more of a multi-layer scattering measurement and a transmission measurement.

27. A method according to claim 25 further comprising making a measurement of the optical density of the liquid and modifying the estimate of the area of liquid.

* * * * *